United States Patent [19]
Fukuoka

[11] Patent Number: 6,104,430
[45] Date of Patent: *Aug. 15, 2000

[54] DIGITAL ELECTRONIC STILL CAMERA WHICH RECEIVES AN INPUT/OUTPUT CONTROL PROGRAM THROUGH A DETACHABLE COMMUNICATION INTERFACE CARD

[75] Inventor: Hiroki Fukuoka, Yokohama, Japan

[73] Assignee: Ricoh Company, Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/535,562

[22] Filed: Sep. 28, 1995

[30] Foreign Application Priority Data

Sep. 28, 1994 [JP] Japan .................................. 6-233291

[51] Int. Cl.⁷ ............................ H04N 5/76; H04N 5/225; H04N 7/00
[52] U.S. Cl. .......................... 348/232; 348/233; 348/375; 348/552; 358/906; 395/831; 396/321
[58] Field of Search ..................................... 348/207, 222, 348/231, 232, 233, 373, 374, 375, 376, 552, 714, 718, 719; 358/906, 909.1; 386/38, 117; 395/200.58, 200.8, 831; 370/466, 467, 465, 469, 463; H04N 5/76

[56] References Cited

U.S. PATENT DOCUMENTS

| | | | |
|---|---|---|---|
| 4,531,161 | 7/1985 | Murakoshi | 360/10.1 |
| 4,746,993 | 5/1988 | Tada | 358/335 |
| 4,951,147 | 8/1990 | Aknar et al. | 358/209 |
| 4,962,521 | 10/1990 | Komatsu et al. | 379/53 |
| 5,032,918 | 7/1991 | Ota et al. | 358/209 |
| 5,034,804 | 7/1991 | Sasaki et al. | 358/41 |
| 5,062,010 | 10/1991 | Saito | 360/35.1 |
| 5,099,262 | 3/1992 | Tanaka et al. | 354/106 |
| 5,136,628 | 8/1992 | Araki et al. | 379/53 |
| 5,138,459 | 8/1992 | Roberts et al. | 358/209 |
| 5,146,353 | 9/1992 | Isoguchi et al. | 358/909 |
| 5,170,262 | 12/1992 | Kinoshita et al. | 358/335 |
| 5,231,501 | 7/1993 | Sakai | 358/209 |
| 5,264,935 | 11/1993 | Nakajima | 358/181 |
| 5,295,077 | 3/1994 | Fukuoka | 358/479 |
| 5,343,243 | 8/1994 | Maeda | 348/222 |
| 5,349,649 | 9/1994 | Iijima | 395/275 |
| 5,367,332 | 11/1994 | Kerns et al. | 348/61 |
| 5,381,412 | 1/1995 | Otani | 370/84 |
| 5,414,464 | 5/1995 | Sasaki | 348/222 |
| 5,475,441 | 12/1995 | Parulski et al. | 348/552 |
| 5,477,264 | 12/1995 | Sarbadhikari et al. | 348/231 |
| 5,479,206 | 12/1995 | Ueno et al. | 348/211 |
| 5,506,617 | 4/1996 | Parulski et al. | 348/207 |
| 5,535,011 | 7/1996 | Yamagami et al. | 358/335 |
| 5,563,655 | 10/1996 | Lathrop | 348/231 |
| 5,581,708 | 12/1996 | Iijima | 395/200.14 |
| 5,646,684 | 7/1997 | Nishizawa et al. | 348/231 |
| 5,666,159 | 9/1997 | Parulski et al. | 348/211 |
| 5,754,227 | 5/1998 | Fukuoka | 348/232 |

FOREIGN PATENT DOCUMENTS

| | | |
|---|---|---|
| 3-268583 | 11/1991 | Japan . |
| 4-980 | 1/1992 | Japan . |
| 5-167979 | 7/1993 | Japan . |
| 2289555 | 11/1995 | United Kingdom .............. G06F 3/00 |

OTHER PUBLICATIONS

Ricoh Digital Electronic Still (Video) Camera, Instruction Manual For Using DC–1.
Ricoh DC–1, Brochure, May, 1995.

*Primary Examiner*—Wendy Garber
*Assistant Examiner*—Ngoc-Yen Vu
*Attorney, Agent, or Firm*—Oblon, Spivak, McClelland, Maier & Neustadt, P.C.

[57] ABSTRACT

A digital electronic camera which can accept various types of input/output cards or memory cards. When an I/O card is inserted into and connected with the camera, a processor within the camera determines the type of I/O card which has been connected by reading a memory location within the card. A control program which is contained in the I/O card is transferred to a memory within the camera in order for the camera to perform I/O functions which correspond to the type of the inserted card. Different types of I/O cards which may be used include a modem card, a LAN card, a SCSI card, or an ISDN interface. Image signals and audio signals are transmitted between the camera and an external processor, information describing the status of the camera is transmitted from the camera to the external processor, and commands to control the camera are transmitted to the camera from the external processor.

29 Claims, 12 Drawing Sheets

DIGITAL ELECTRONIC STILL CAMERA WHICH RECEIVES AN INPUT/OUTPUT CONTROL PROGRAM THROUGH A DETACHABLE COMMUNICATION INTERFACE CARD

CROSS-REFERENCES TO RELATED APPLICATION

This application is related to commonly owned co-pending U.S. patent application Ser. No. 08/535,378 concurrently filed with the present application and entitled "Digital Electronic Camera Having an External Input/Output Interface Through Which the Camera is Monitored and Controlled", which is incorporated herein by reference.

BACKGROUND OF THE INVENTION

1. Field of the Invention

The present invention relates to digital electronic cameras including still cameras and cameras capable of recording a series of images. The invention is further related to the input/output interface of the camera and more particularly the manner of transferring an input/output control program from the I/O interface to the camera.

2. Discussion of the Background

As the size and cost of electronic components goes down, the popularity of digital electronic cameras which operate without using photographic film increases. A problem with digital electronic cameras is that after a picture is taken, special steps must be performed in order to obtain a photographic print of the desired image or to transfer the electronic image to a suitable device for further processing and viewing.

One manner of transferring electronic images out of an electronic camera is disclosed in U.S. Pat. No. 5,138,459, issued to Roberts et al, which is incorporated herein by reference. This patent discloses the use of a disk drive assembly which is compatible with both Apple Macintosh computers as well as IBM compatible personal computers. The disk drive of this camera uses either the IBM or Apple format, depending upon the position of an operator selected switch.

Another manner of transferring images out of an electronic camera is disclosed in Japanese Laid-Open Patent Publication 4-980 (1992) which discloses the use of a plug-in communication interface card which allows images to be transferred out of the camera to a digital recording device. The interface allows the output images to be recorded digitally on a tape of a Digital Audio Tape player (DAT).

The present inventor has recognized a problem with these conventional devices in that they do not provide a means for easily allowing the camera to output images using new communication formats and protocols.

SUMMARY OF THE INVENTION

Accordingly, it is an object of the invention to have a flexible communication interface in a digital electronic camera which allows the camera to adapt to various communication protocols. It is another object of the invention to provide a digital electronic camera which is capable of both receiving and transmitting images and commands through the communication interface.

These and other objects are accomplished by a digital electronic camera having an electronic light sensitive device for detecting a photographed image. This image is coded in order to reduce the storage space necessary for the image. Optionally, audio may be detected, compressed, and stored either alone or with the electronic images.

The camera includes a connection for receiving a memory card and/or an input/output (I/O) interface card. The memory card and I/O card are preferably PCMCIA compatible cards. When the I/O card is plugged into the camera, an I/O control program contained within the I/O card is transferred to a memory within the camera. When the camera performs I/O functions through the I/O card, they are performed in accordance with the communication control program within the camera.

By providing the program within the I/O card, the camera can perform communication through any type of electronic communication medium using any type of electronic communication protocol, as long as the proper program exists in the I/O card. Subsequently, the camera itself can be made inexpensively as it does not need to have programmed therein when initially purchased every I/O protocol. Further, as new protocols are developed, they can be easily used by the camera simply by plugging in a new card containing the corresponding I/O interface program.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
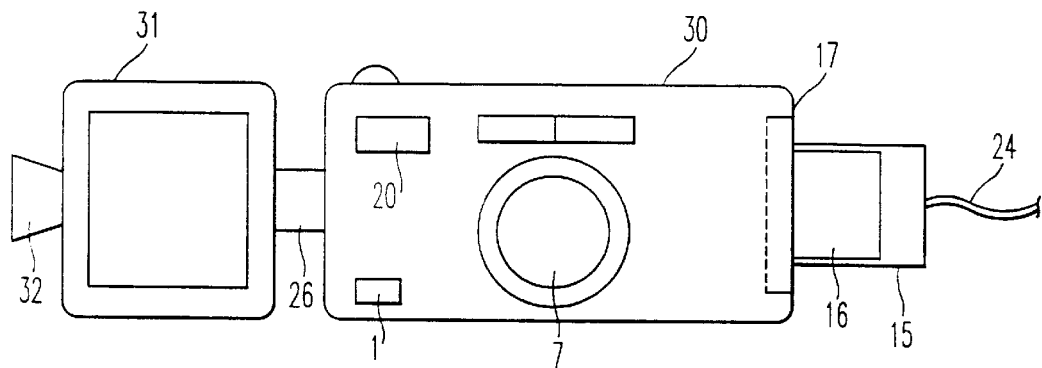
FIG. 1 illustrates a digital electronic camera constructed in accordance with the invention connected to an image and audio display device, and having a memory card and input/output card connected thereto.

Referring now to the drawings, wherein like reference numerals designate identical or corresponding parts throughout the several views, and more particularly to FIG. 1 thereof, there is illustrated a digital electronic camera 30 constructed in accordance with the teachings of the present invention. This digital electronic camera is designed to capture still images but can also capture a series of still images in order to create moving pictures in a similar manner as a cam-corder or video camera captures moving images. The camera 30 includes a lens 7, a microphone 1 for obtaining audio, and a flash 20 for illuminating an object to be photographed. The camera 30 includes a card connector 17 for receiving two PCMCIA type cards such as a memory card 16 and an input/output (I/O) card 15 which has a communication line 24 connected thereto. The I/O card 15 allows images, audio, and control information to be transmitted into and out of the camera 30. Connected to the camera 30 is an audiovisual monitoring device including a color LCD panel 31 and an audio speaker 32. Images captured through the lens 7 and from images stored in the memory card 16 along with audio can be displayed and played on the LCD panel 31 and speaker 32, respectively. Additionally, various commands and status information along with any other information such as the status of I/O functions can be displayed on the LCD panel 31. The LCD panel 31 including the speaker 32 is not required to operate the camera and are easily detachable from the camera in order to reduce the size and weight of the camera, if desired.

Figure 2:
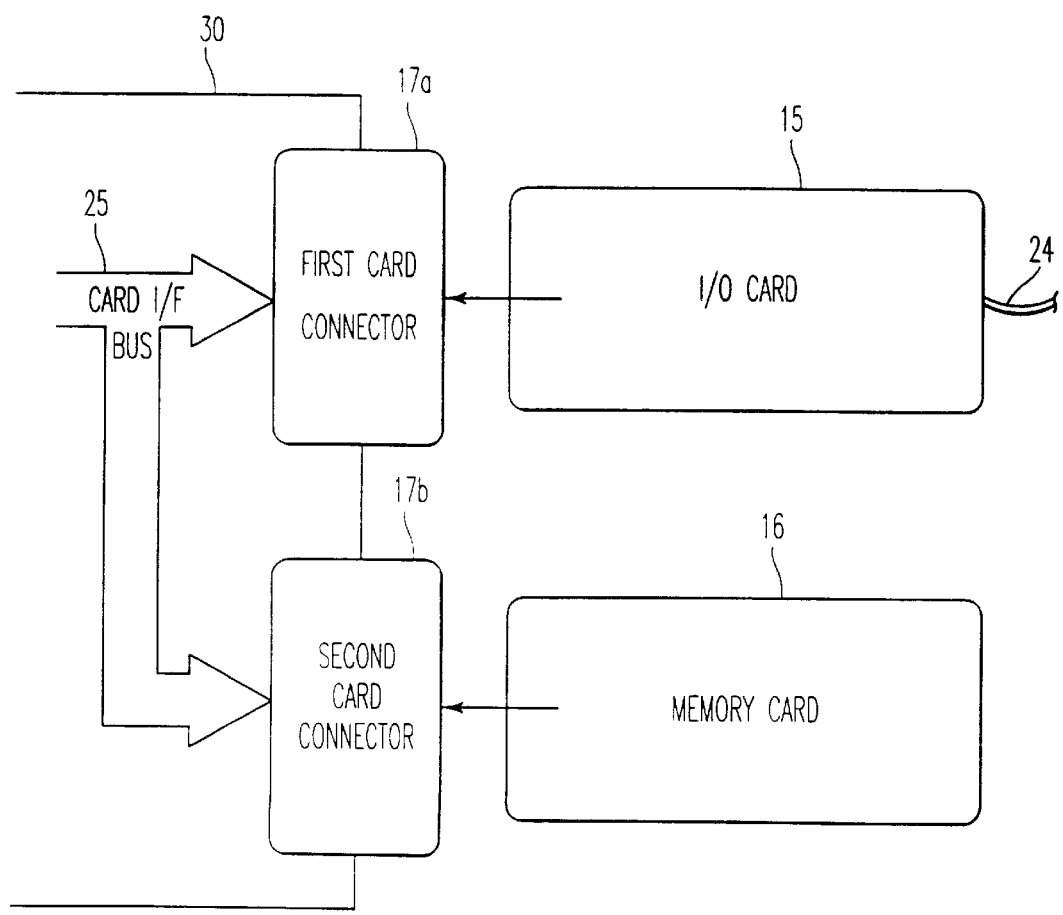
FIG. 2 illustrates the I/O card and the memory card being connected to the camera.

FIG. 2 illustrates the details of how the cards 15 and 16 are connected to the camera 30. The camera 30 includes a first card connector 17a and a second card connector 17b, both connected to a card interface bus 25. The cards 15 and 16 can be connected to either of the card connectors but are illustrated as I/O card 15 being connected to the first card connector 17a and the memory card 16 being connected to the second card connector 17b. The memory card 16 can be any type of memory device which plugs into the camera. However, the preferred embodiment of the memory card is a PCMCIA flash memory card which conforms to the PCMCIA 2.1/JEIDA 4.2 standard and which can plug into personal computers in order to easily transfer images and sound to a computer. Additionally, the control program for the I/O card may be transferred either from the memory card 16 or preferably, from the I/O card 15 to a memory within the camera 30. As an alternative to having the communication line 24 connected to the card 15, the line 24 may be connected to other parts of the camera through appropriate terminals.

Figure 3:
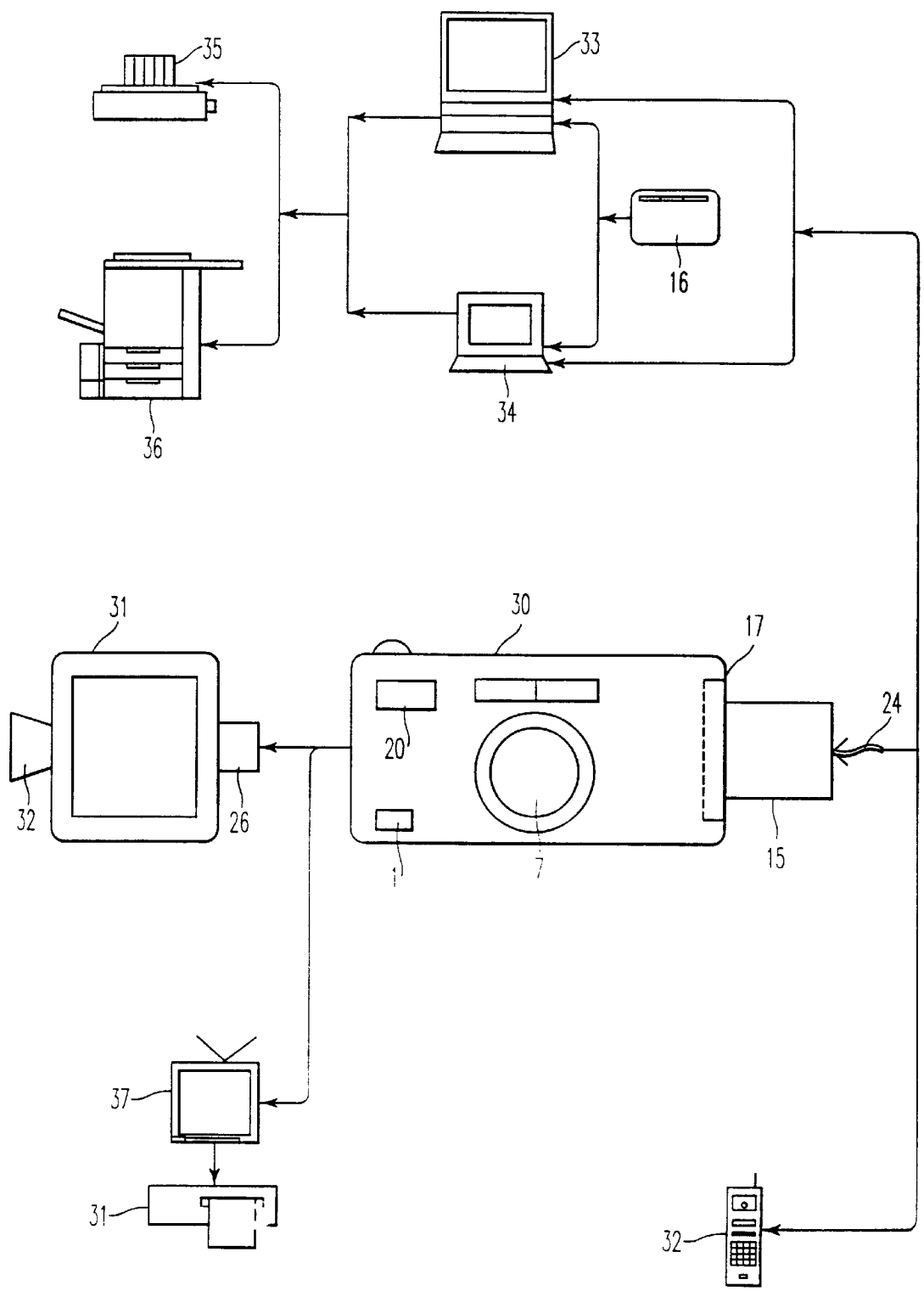
FIG. 3 illustrates the camera connected to various types of monitoring, printing and processing devices including a television, telephone, computers, and printers.

The camera of the present invention is quite flexible in that it can be connected to many different types of peripheral devices. As illustrated in FIG. 3, the camera is connectable to the LCD panel 31 and speaker 32. Alternatively, audio/video outputs from the camera 30 may be connected to a television 37 which is connected to a photograph printer 31. Further, the I/O card 15 may be connected through the line 24 to a telephone 32 which is either a cellular or wireless phone, or a phone connected to a conventional public service telephone network (PSTN), a PBX telephone system or an ISDN. In order to connect the camera 30 the telephone 32, the I/O card 15 or the camera itself must function as a modem. Images captured by the camera can be transferred through the I/O card 15 which functions as a modem connected to an on-line service such as America On Line. This inexpensively allows images to be taken by a person at a first location to be transferred to a file storage device and subsequently viewed by another person at a second location who has access to the image/voice files. As an alternative to having the I/O card 15 function as a modem, the I/O card 15 may function as an RS-232 interface which is connected to a separate modem.

In FIG. 3, the camera 30 is also illustrated as being connected to a desk-top computer 33 or a lap-top portable computer 34. In this case, the I/O card 15 will function as a serial communication connector card such as an RS-232 communication interface. Additionally, the memory card 16 may be inserted into either of the computers 33 or 34. Typically, the portable computer 34 will have built therein a PCMCIA connector to receive the memory card 16 containing images and possibly sound which are recorded by the camera 30. A PCMCIA card reader or peripheral connector will have to be used in conjunction with the desk-top computer 33 to read the information from the memory card 16. The computers 33 and 34 can display the recorded images and sound, may be used to manipulate the images and sound, and may be used to monitor and control the camera. The computers 33 and 34 can be IBM-PC compatibles, Apple Macintosh compatibles, or any other type of computer. The computers are connected to a color printer 35 which prints color photographs of the images captured by the camera or a digital copier 36 which also prints full-color photographs of the captured images.

Figure 4:
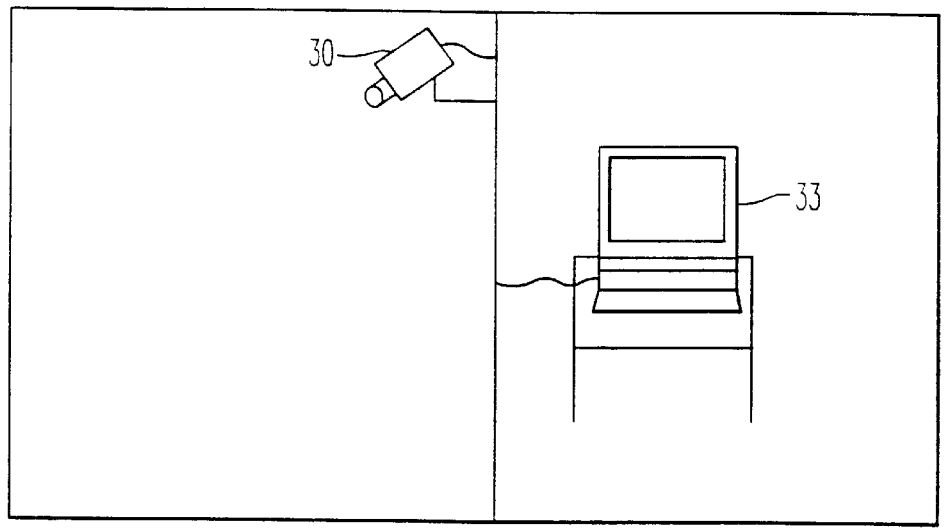
FIG. 4 illustrates a camera constructed in accordance with the invention connected to a computer which is in the same building as the camera.

A feature of the invention is that the digital electronic camera can remotely transmit and receive images from a connected computer and also be monitored or controlled by the computer. FIG. 4 illustrates the camera 30 which is in a first room connected to the computer 33 which is a different room of the same building. In this manner, images of the digital electronic camera 30 can be monitored and stored in the computer 33 and the computer 33 can be used to control and monitor the settings of the camera 30 such as the brightness or luminance of the image, the amount of image compression performed by the camera 30, the white balance of the camera 30, or other operating parameters.

Figure 5:
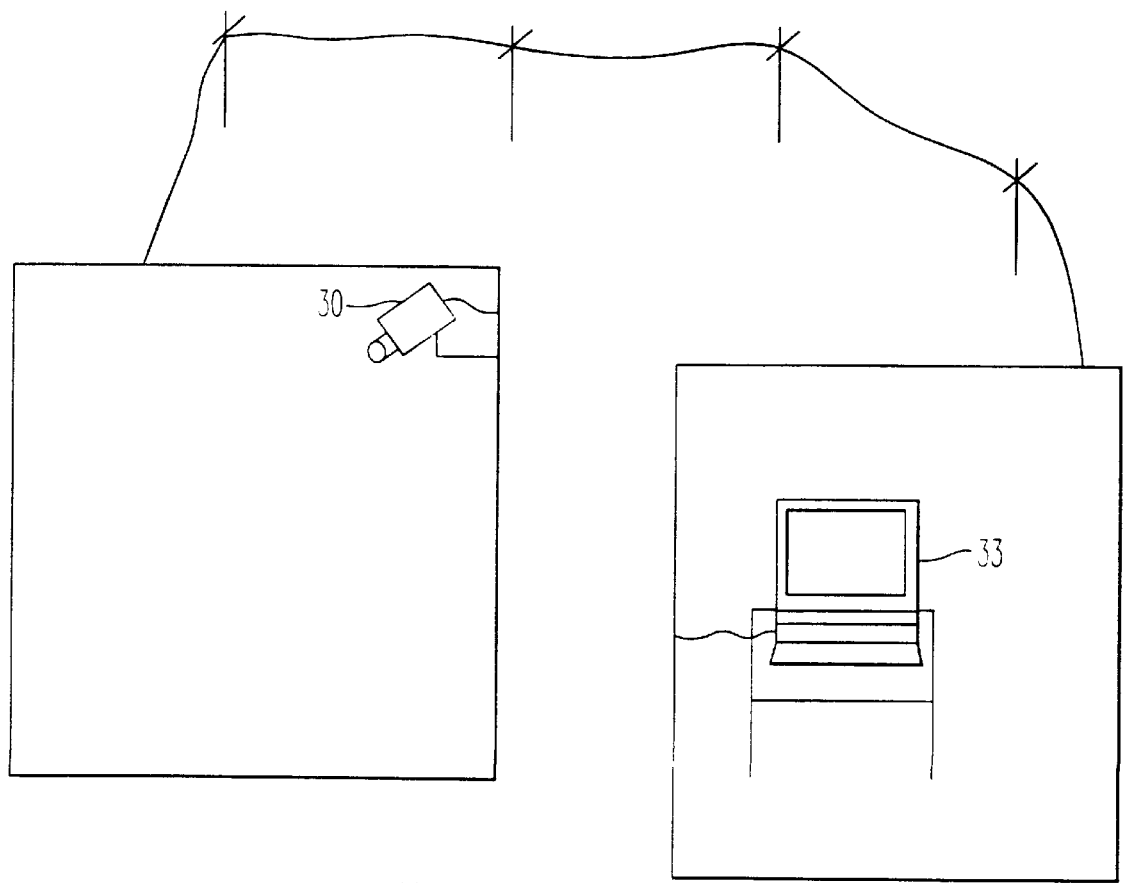
FIG. 5 illustrates the camera connected to a computer which is located in a building which is different from the building containing the camera.

FIG. 5 illustrates that the camera 30 and monitoring computer 33 can be located in different buildings and connected by wires such as through a telephone network or other manner of communication such as by wireless communication. The remote connection of the camera 30 to the computer 33 can be quite useful for monitoring purposes such as for security or safety reasons. By connecting the camera 30 to a Local Area Network (LAN), a plurality of cameras may be connected to a single communication line. Also, the camera of the present invention can be easily used to monitor a baby or other object by an adult who is at home, even if the adult is working on a computer due to the increasing popularity of the displaying of a plurality of windows on a computer. Further, through the use of modems, a telephone call from the computer 33 to the camera 30 can allow for an expensive manner of performing a remote monitoring function. Additionally, a conventional camera moving system can be employed which allows the camera position to be remotely controlled by the computer 33 or other controlling device.

Figure 6:
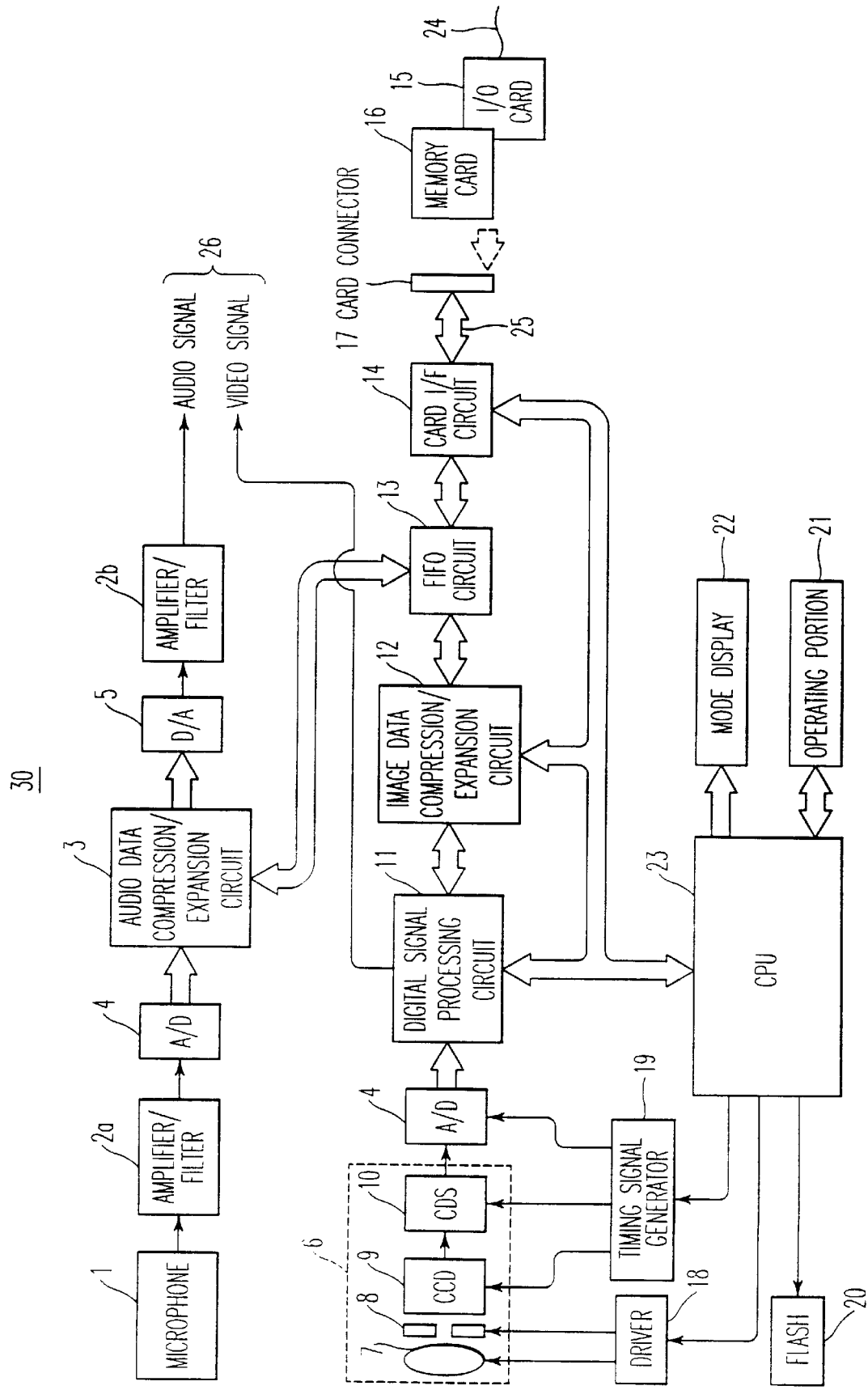
FIG. 6 is a block diagram illustrating the construction of the camera.

FIG. 6 is a block diagram showing the details of the construction of the camera 30. The microphone 1 is connected to an amplifier/filter 2a, which outputs a signal to an analog-to-digital converter 4. The amplifier/filter 2a reduces the audio signal to the appropriate bandwidth. The analog-to-digital converter 4 operates with an optimum sampling frequency, for instance, at a frequency which is an integer-times of the sub-carrier frequency of an NTSC signal used by the camera. Further, a sampling frequency of the A/D 4 is more than two times the necessary bandwidth. An audio data compression/expansion circuit 3 is used to encode and decode audio signals using known methods of audio encoding such as linear PCM, Dolby AC-3, or MPEG-2 audio encoding. The compressed audio signals are transmitted to a FIFO circuit 13 which functions as a memory and alternatively can be a DRAM. The FIFO circuit 13 includes a section for images and a section for audio. Unencoded digital audio signals from the compression/expansion circuit 3 are transmitted to a digital-to-analog converter 5 and subsequently amplified and filtered by the amplifier/filter 2b. The audio signals included in the signals 26 are then output to a suitable audio generator such as the speaker 32 or a speaker of a television.

An image photographing section 6 of the camera includes a photographing lens 7, a lens opening 8, an image photographing element 9 such as a CCD (charge coupled device) or a MOS-type image photographing element. The CCD 9 in the preferred embodiment has a resolution of 768×480 (horizontal×vertical). The output of the CCD 9 is transmitted to a circuit 10 which eliminates noise from the analog signal output by the CCD 9. This may be accomplished by a correlative doubled sampler (CDS). The output image signal from the image photographing portion 6 is transferred to an analog-to-digital converter 4 which transmits a digital image signal to a digital signal processing circuit 11 which, for example, performs ordinary and known treatment of the image signal including gamma-compensation, color separation, and generates the luminance signal Y, and color difference signals Cb and Cr in a known manner. An example of the performance of these functions is disclosed in U.S. Pat. No. 5,343,243, which is incorporated herein by reference. Video signals (either analog or digital) are output from the digital signal processing circuit 11 as a video signal 26 which is display by the color LCD panel 31.

An image data compression/expansion circuit 12 can be used to encode and decode the images using known image compression methods which transform the images into and out of compressed formats such as GIFF, JPEG, MPEG or any other known image compression method. Details of image compression which may be used by the camera 30 are disclosed in U.S. Pat. No. 5,414,464 which is incorporated herein by reference. A card interface circuit 14 is connected to the card connector 17 through the card interface bus 25. The card interface circuit 14 controls communications between the camera and the plug-in communication cards which for example may function as a LAN card, a modem card either for a conventional wired telephone system or a cellular phone, a Small Computer System Interface (SCSI) interface, or an ISDN interface, or any other type of communication device. From interface circuit 14, images and audio are output to memory card 16 or I/O card 15. Also, images may also be transferred to interface circuit 14 from cards 15 or 16.

A Central Processing Unit 23 (CPU) controls the operation of the camera and is connected to a mode display 22 which displays various operating parameters of the camera including modes which have been set and operating parameters of the camera. The mode display 22 may be an LCD or LED display. An operating portion 21 through which the user inputs commands such as the command to take a picture when the shutter button is pressed, whether sound is recorded, whether still images or a series of still images forming moving images are recorded, and all other operations of the cameras. A flash 20 which is powered by batteries (not illustrated) is connected to the CPU 23 and is used to illuminate the scene to be photographed. There is a driver 18 which drives a mechanical system of the image photographing portion 6 and performs functions such as focusing and zooming of the lens. The timing signal generator 19 generates various timing signals as images are captured such as a vertical synchronizing signal, a horizontal synchronizing signal, and a CCD synchronizing signal.

Compressed images which are stored in the memory card 16 may be read out of the memory card 16 through the card interface circuit 14 and stored in the FIFO circuit 13. The compressed images are subsequently transferred to the image data compression/expansion circuit 12 which decodes or expands the compressed image signals and transfers the signals to the digital signal processing circuit 11. In the digital signal processing circuit, the luminance and color difference signals are transformed to a NTSC signal and output as a video signal.

Compressed audio information is similarly read out of the memory card 16 and written into the FIFO circuit 13. The encoded audio signals are transferred to the audio data compression/expansion circuit 3 where they are converted to an uncompressed digital form, converted to an analog form by the digital-to-analog converter 5, and amplified and filtered by the amplifier filter 2b. The converted signal is output as the audio signal.

The digital images captured by the camera are used to create exposure controlling evaluation information, automatic focus controlling information, and automatic white balance evaluation information by the CPU 23. Automatic control of the camera is performed using this information. Additionally, this and all other evaluation data, control data, status data, etc., can be output through or stored in the I/O card 15 or stored in the memory card 16. This information may be used, for example, when monitoring the camera in order to determine if an abnormal state exists. Further, the quality of the image can be optimized by changing the number of pixels used to represent an image.

The CPU 23 also performs a clock function for recording the date and time of when the audio and video has been captured. Additionally, a field number may be added to the image data by the CPU 23. Each of the image data, audio data, date, time, and field number may be output through the card interface circuit 14 to either the memory card 16 or I/O card 15.

Figure 7:
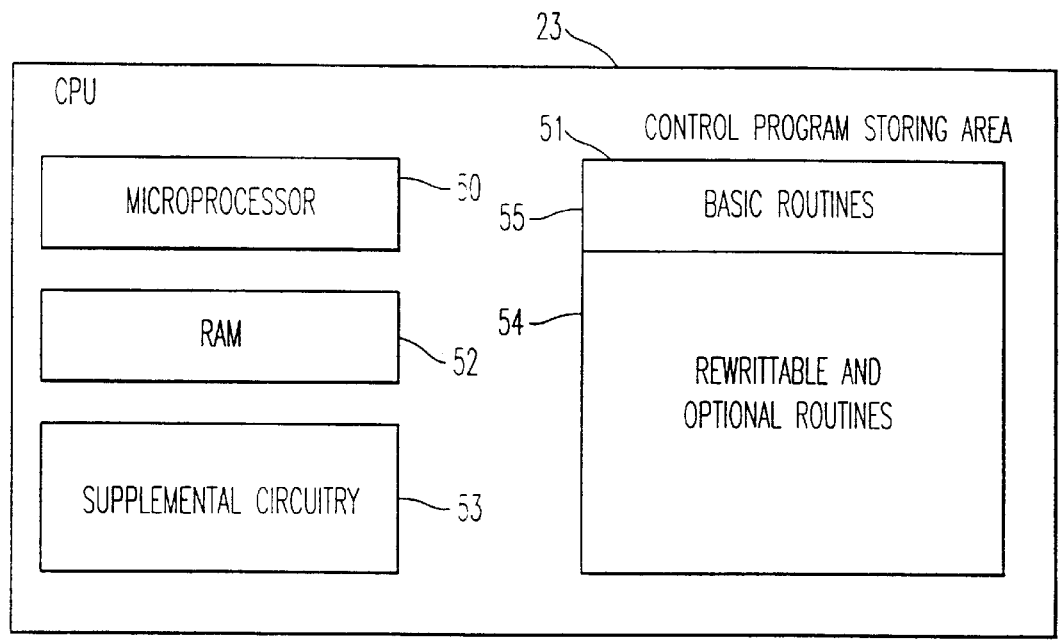
FIG. 7 is a block diagram illustrating the details of the CPU of the camera.

Details of the CPU 23 are illustrated in FIG. 7. In FIG. 7, the CPU 23 contains a microprocessor 50, RAM 52 for storing various information and serves as a working memory area as calculations are being performed, and a control program storing area 5L. The control program storing area 51 includes a section 55 for storing basic routines such as BIOS (Basic Input Output System) routines, and other routines used by the system. The basic routines 55 are stored in a non-volatile memory such as a flash memory, an EPROM, or other type of memory. There is a section of the control program storing area 51 which stores rewritable and optional routines which may be loaded in from the memory card 16 and the I/O card 15. Section 54 may be constructed using the same flash memory as stores the basic routines 55 or may be a separate memory. In order to reduce the size of the chip and reduce the cost of the chip which may be used as the CPU 23, it is desirable to use a flash memory to store the basic routines 55 and the rewritable and optional routines 54. The CPU 23 may either be a single chip or be composed of multiple components. By having a section for rewritable and optional routines, the camera becomes very flexible by allowing the camera to be programmed as desired and there is no need to store routines which are not going to be used. This rewritable and optional routines section is especially useful for the process of inputting and outputting information as there are many different communication protocols which may be used. The control program storing area 51 stores routines which control the fundamental functions of the camera and other functions such as reading out program data, changing parameters within the camera, writing data into the rewritable and optional routines section 54, and any other function of the camera. Supplemental circuitry, 53 performs functions which are necessary for the CPU and includes a bus controller, a serial communication controller, an interrupt controller and analog-to-digital converter for monitoring analog signals, and a clock for keeping track of the time and date.

Figure 8:
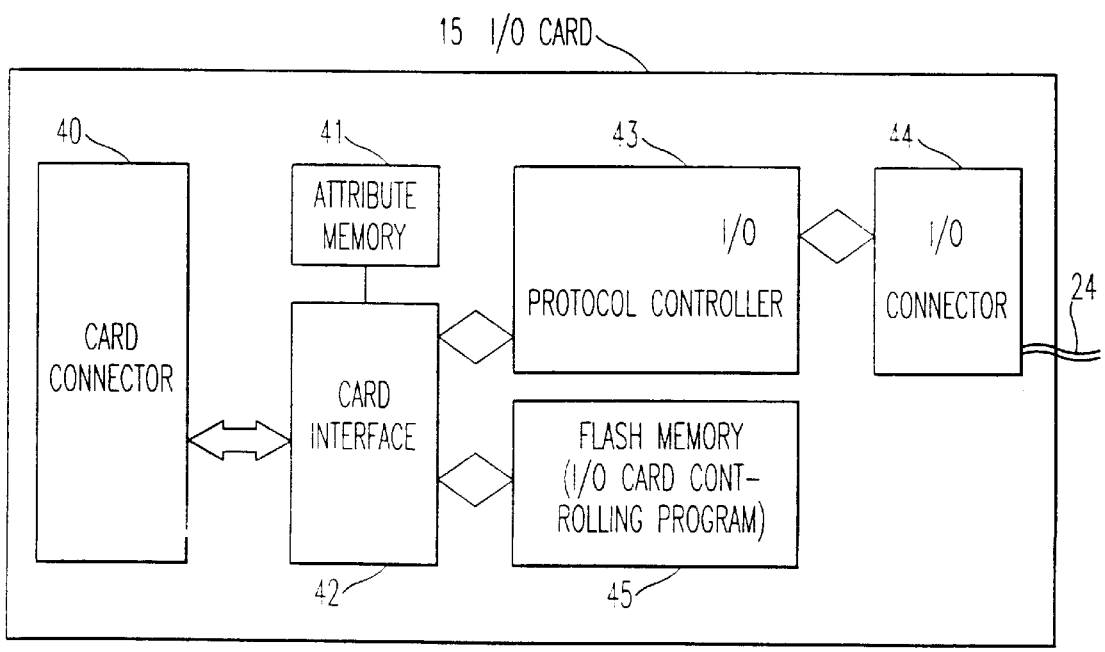
FIG. 8 illustrates details of the I/O card of the camera.

FIG. 8 is a block diagram showing the construction of the I/O card 15. The I/O card, if desired, can include the functions of the memory card 16 if it is provided with a sufficient amount of memory. The I/O card 15 includes a card connector 40 which plugs into the card connector 17 of the camera. There is an attribute memory 41 for storing attributes of the I/O card such as whether the I/O card is a LAN card, a SCSI card, a serial card, a parallel card, an ISDN card, a modem card, includes memory to store images and sound, etc. There is a card interface 42 which interfaces communications between the camera and the I/O card 15 and also contains sufficient memory to store some picture and audio data. The exact size of the memory within the card interface 42 depends on the requirements of a user. An I/O protocol controller 43 serves as the main processor of the I/O card 15 and controls the functions performed within the I/O card. The I/O protocol controller 43 controls communication to ensure conformance with the appropriate type of communication protocol, which corresponds to the information stored in the attribute memory 41. A flash memory 45 contains the I/O card controlling program which is loaded into the rewritable and optional routines section 54 of the control program storing area 51 illustrated in, FIG. 7. This control program is transferred to the rewritable and optional routine section 54 after the I/O card 15 is inserted into the camera. The communications which enter and leave the camera through the line 24 pass through an I/O connector 44 which may be any type of connector which is suitable to connect with the line 24.

Figure 9:
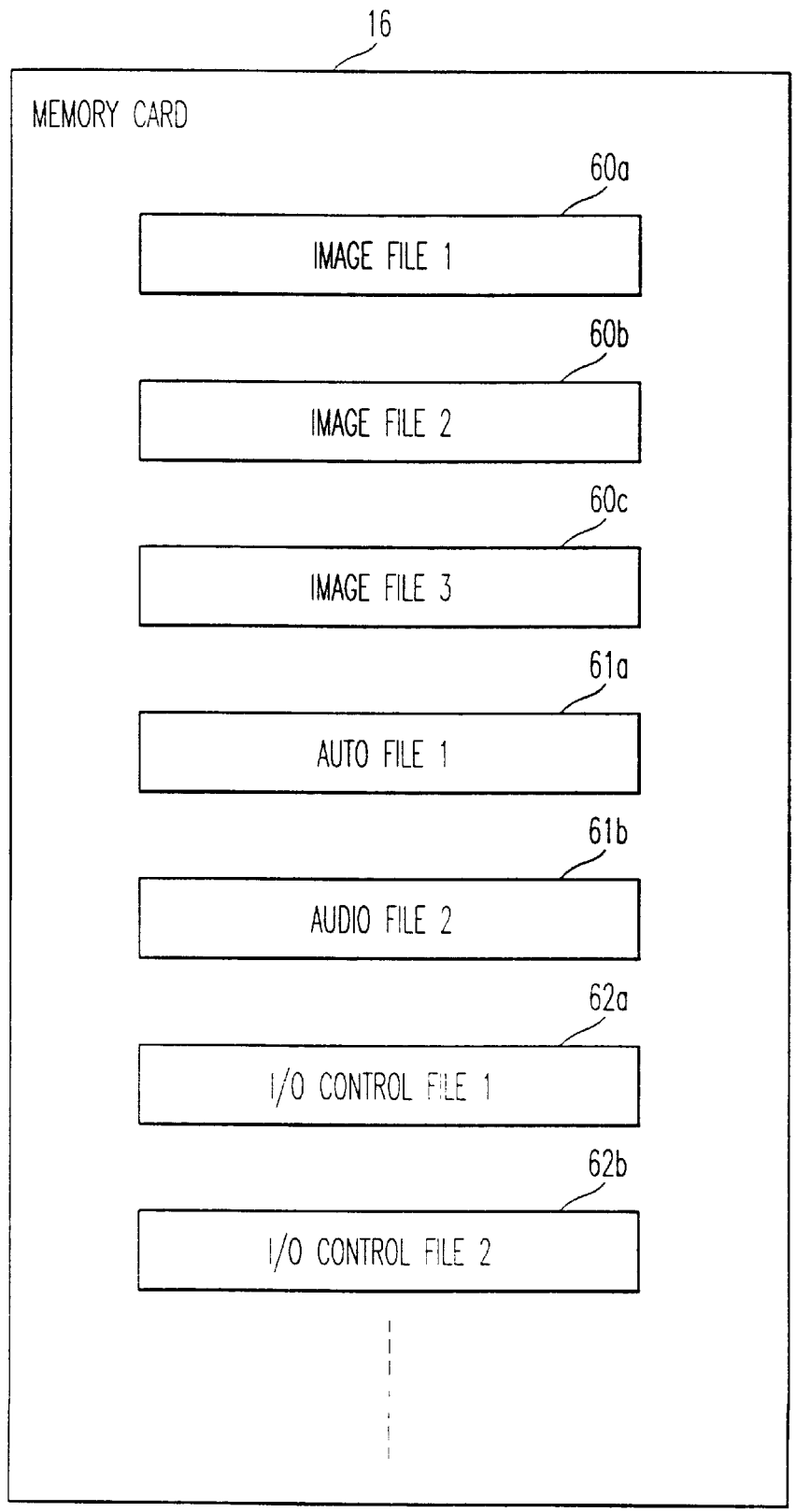
FIG. 9 illustrates the constructions of the files within the memory card.

FIG. 9 is a block diagram showing an example of the organization of files within the memory card 16. As the memory card 16 will be readable by a personal computer such as an IBM compatible or Macintosh compatible computer, the files will be stored according to the corresponding file format such as a DOS format used with IBM PC compatible computers. The memory card 16 contains three images files 60a–60c, two audio file 61a and 61b, and two input/output control files 62a and 62b. As an alternative to storing the illustrated files in the memory card 16, these files may also be stored in the I/O card 15. The I/O control files are used to indicate the type of files and other information regarding how the files are arranged and how to read the files. In order for the camera to read and utilize new file formats, the I/O control files may be transferred to the rewritable and optional routine section 54 of the CPU. These I/O control files may also store conventional DOS or Macintosh file format information. As the camera can receive I/O control files, it does not have to be pre-programmed with every different type of control file which can reduce the expense of the camera and the amount of memory needed in the camera.

Figure 10:
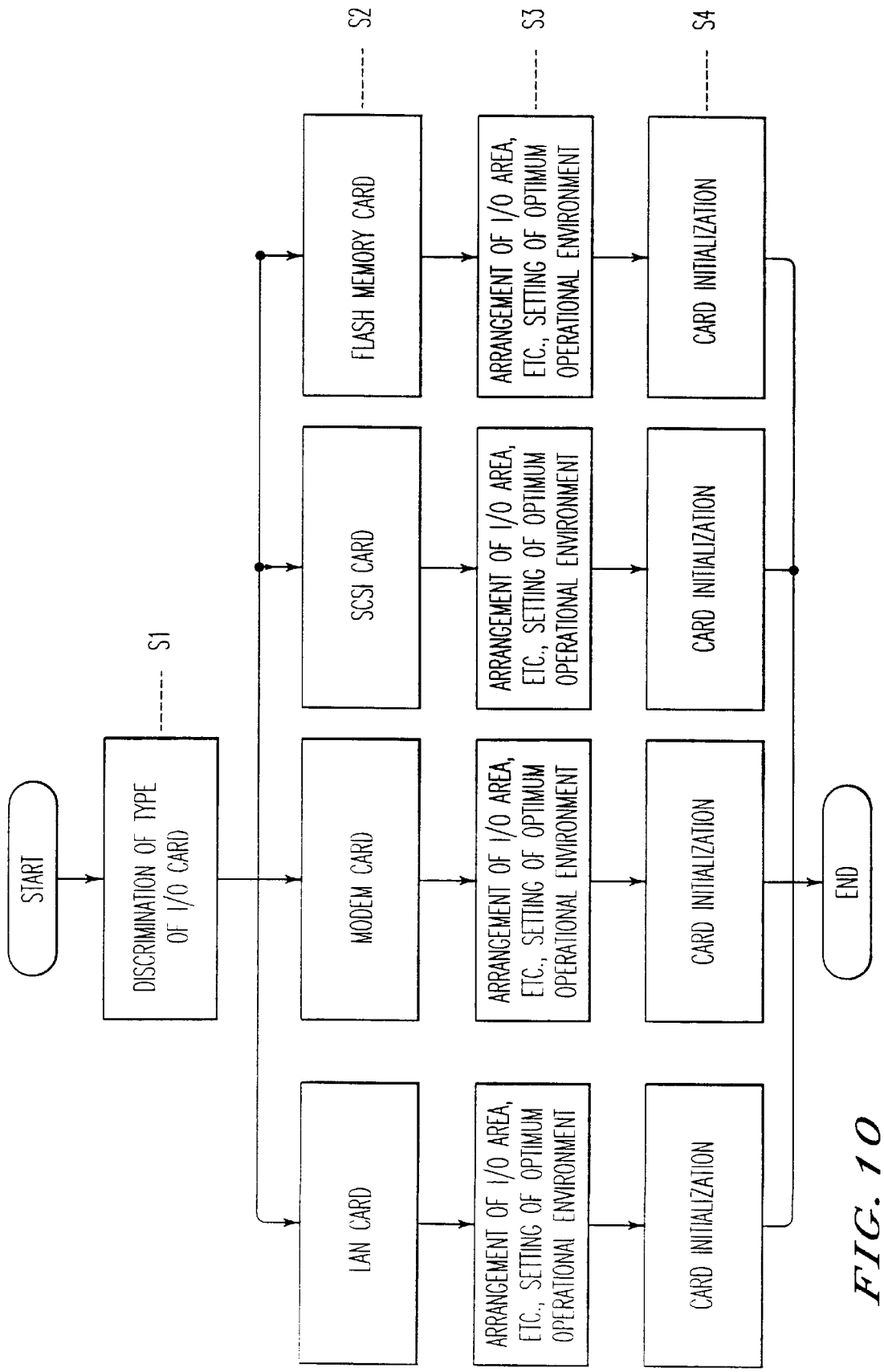
FIG. 10 is a flowchart illustrating the processing performed when various types of cards are used with the camera.

When a card is inserted into the camera, the camera may prompt the operator to select the appropriate I/O or memory functions. Additionally, the control program in the card is transferred to the rewritable and optional routines section 54 of the control program storing area 51 of the CPU 23. FIG. 10 is a flowchart showing the process performed after a card is inserted into the camera. After the card is inserted into the camera, step S1 determines the type of I/O card and other properties of the card. Once the type is determined, separate operations are performed depending upon the type of card. Step S2 indicates the type of card which is inserted such as a LAN card, a modem card, a SCSI card, or a flash memory card. Subsequently, the mapping and arranging of the I/O area are performed and the optimum construction of the hardware operation is established from the effective operational environment in step S3. Next, the cards are initialized by register initialization which corresponds to the particular type of I/O card in step S4. The process then ends. At any time during the process illustrated in FIG. 10, the control program is transferred from the I/O card to the memory within the camera. After the process illustrated in FIG. 10 is performed, whenever the camera performs an I/O function, the CPU 23 executes the protocol control of the respective I/O card in accordance with the loaded control program so that the camera can transmit and/or receive image data, audio data, status information, and/or commands. As an alternative, it is possible to execute the I/O control program within the card without transferring the control program to the camera.

The memory card such as a flash memory card is considered a type of I/O card. For any type of memory card such as a SRAM card, a ROM card, etc., the appropriate control program transferring may also be performed.

Figure 11:
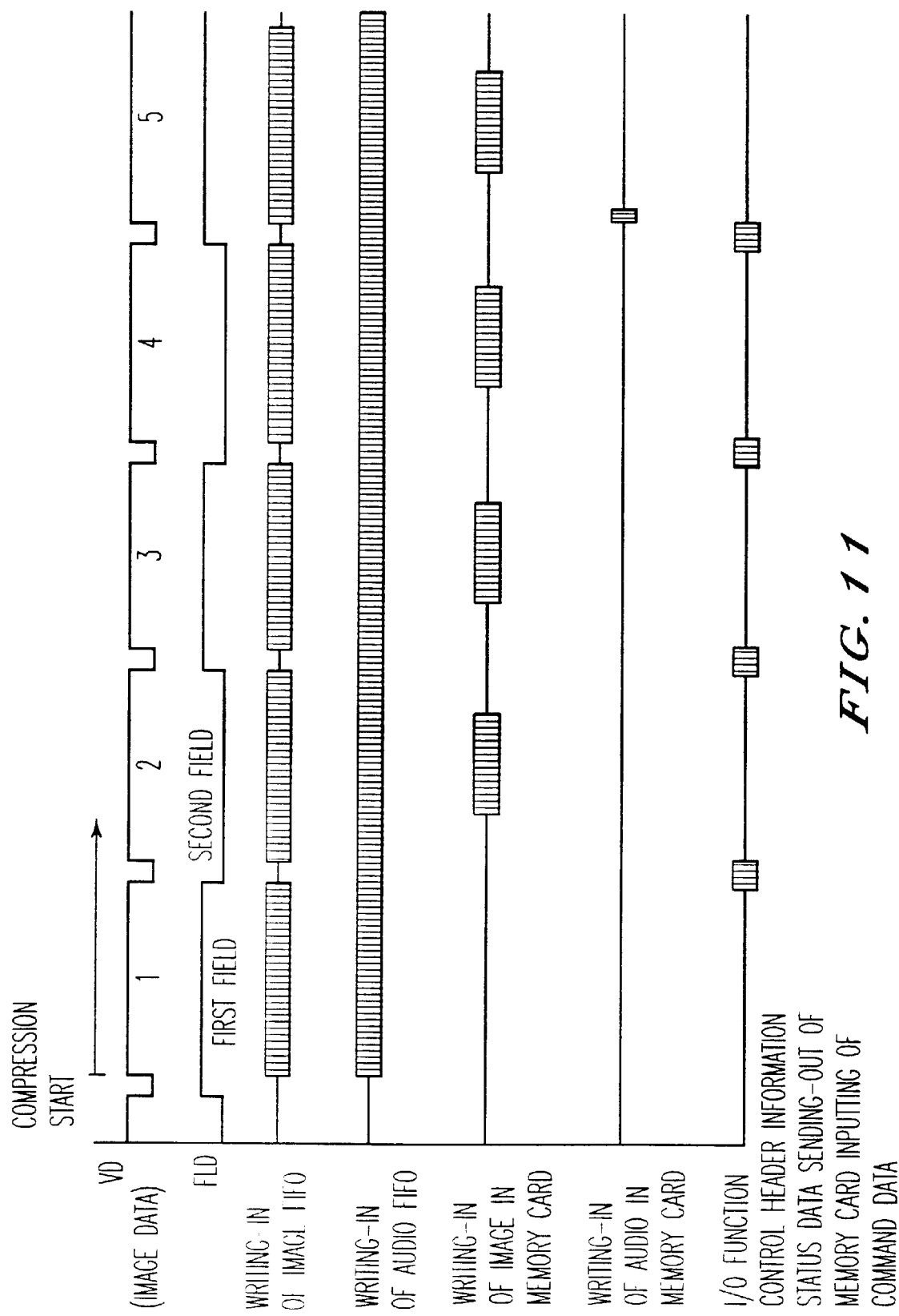
FIG. 11 is a timing diagram illustrating the coding of image and audio signals.

FIG. 11 is a timing diagram illustrating the operation of encoding or compressing image and audio data and the process of transmitting this data in real time. In FIG. 11, when the image compression or encoding begins, a start command is received from the side of the memory card 16, the image data compressed in real time in the JPEG (Joint Photographic Expert Group) format is written in the FIFO circuit 13. All of the real time image transmitting periods are the same. Next, the CPU 23 controlling the system sends out the status information and table information used for encoding and decoding at the camera side to the I/O side during the vertical blanking period. The image data recorded in the FIFO circuit 13 in the next field are transmitted with high speed to the memory card 16 functioning as a recording medium by a direct memory access (DMA) transferring process. When a request is issued from the memory card 16 during the vertical blanking period, the camera control commands and parameters are read out from the memory card or I/O card to the camera.

When the image coding system is a variable length coding system such as JPEG, it is necessary to perform the operation of controlling so as to prevent the FIFO circuit 13 from overflowing during the vertical blanking period. In such a manner, the coded image data is transmitted to the memory or I/O card in real time and the status signal at the camera is sent out and the camera controlling command sent from the memory card 16 is read out and the internal control is practiced. The above operation continues until the digital camera receives the real time data stopping command from the memory card.

With regard to compression of the audio information, the audio compression occurs at the same time as the image compression is occurring. The compressed audio data is written byte by byte in the audio FIFO of the FIFO circuit 13 every 250 microseconds. When the fullness of the FIFO reaches a predetermined amount, the CPU 23 instructs the card interface circuit 14 to perform DMA transfer to the memory card 16. Usually, checking of the remaining capacity of the audio FIFO is practiced during the vertical blanking. The audio data and image data are sent using a time sharing method to the memory card 16. The above described process is equally applicable to both the memory card and I/O card.

Figure 12:
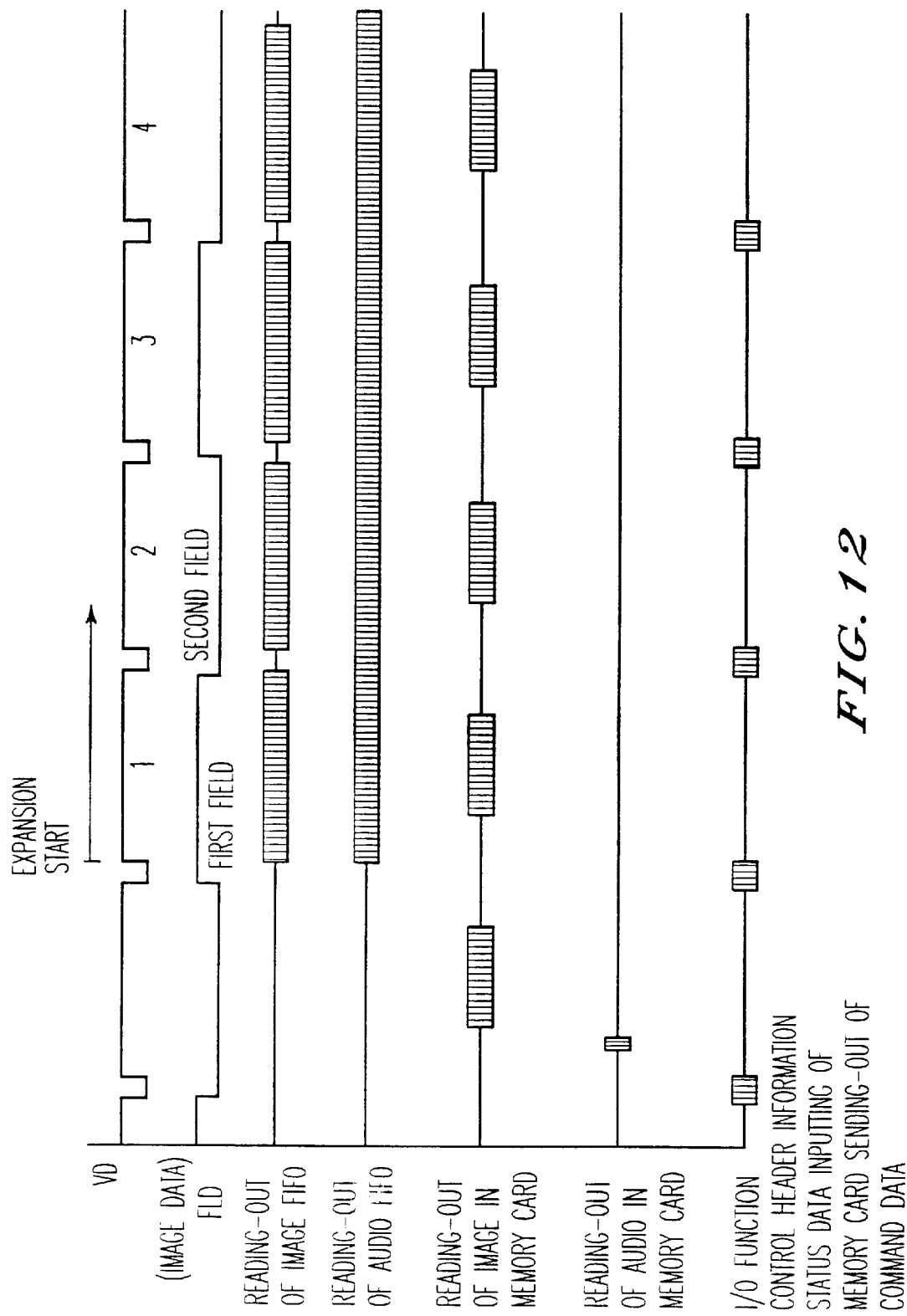
FIG. 12 is a timing diagram illustrating the decoding of coded image and audio signals.

FIG. 12 illustrates a system timing diagram when the image and audio data are read from the memory card (or I/O card) and are decoded or expanded by the camera. In FIG. 12, the quantized Huffman table used during encoding and decoding is transferred to the image expanding portion of the image data compression/expansion circuit 12. The compressed images and audio information are transferred via DMA from the memory card to the corresponding FIFO of the FIFO circuit 13. The CPU 23 then issues an instruction to start expansion in order to decode the image and audio information. Subsequent image information is read and transferred via DMA. With regard to the audio information, the audio is read one byte per 250 microseconds. Usually, the operation of reading out the audio data to the audio FIFO is practiced during the vertical blanking period. In such a manner, the audio data are received independently of the image data and transferred to the camera and decoded. However, the audio and image data are synchronously presented to a viewer. Further descriptions of the use of audio and video in electronic cameras is disclosed in U.S. Pat. No. 5,062,010 and U.S. Pat. No. 5,032,918, both of which are incorporated herein by reference.

Figure 13A:
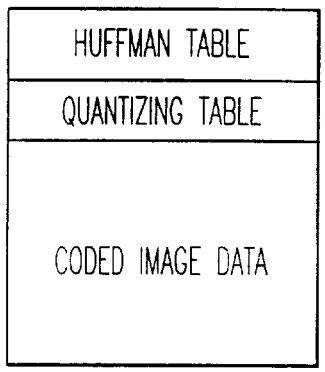
FIGS. 13A–13C illustrate different manners of constructing the coded image data.

The encoded JPEG image information is based on a Huffman table and a quantizing table. In order to decode encoded information, it is necessary to have the same information which was used to encode the image. As long as the decoder has access to the same tables which were used for encoding, there is no need to store and transmit the Huffman and quantizing tables with the encoded signals. FIG. 13A illustrates the transmitted and stored information as containing the Huffman table, quantizing table, and coded image data.

Figure 13B:
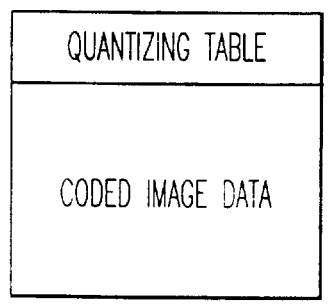
Figure 13C:
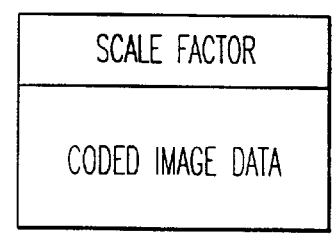

If the Huffman table is available to both the encoder and decoder, it is not necessary to include the Huffman table with the encoded data. However, as the quantizing information of the encoded data changes, it is necessary to include the quantizing table with the encoded information, as illustrated in FIG. 13B. However, the quantization table takes up storage space and a more efficient way of transmitting and storing the encoded image data is to have the same quantizing table at both the encoder and decoder. However, as the quantizing values change, it is necessary to have some sort of representation as to the degree of quantization. One manner of accomplishing this is to transmit a scale factor which is multiplied by values in the quantization table available to both the encoder and decoder in order to determine the final quantization values. FIG. 13C illustrates the coded information containing both the scale factor and coded image data. FIG. 13C is the minimum amount of coded image information which can be transmitted.

Figure 14A:
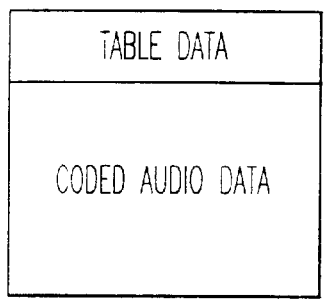
FIGS. 14A and 14B illustrate the manner of coding audio signals.
Figure 14B:
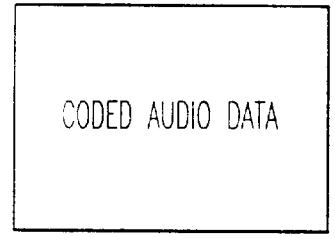

Regarding the encoded audio signals, when the audio is encoded using a typical audio compression method, a table is used to code the audio data. In order to assure that when the encoded audio is expanded or decompressed, a table used during the encoding process may be included in a packet of audio information, as illustrated in FIG. 14A. However, if it is known that the decoder or expansion circuit will contain the same table as was used to encode the audio information, it is not necessary to transmit the table with the encoded data and the encoded audio information packet can be constructed as illustrated in FIG. 14B.

Figure 15:
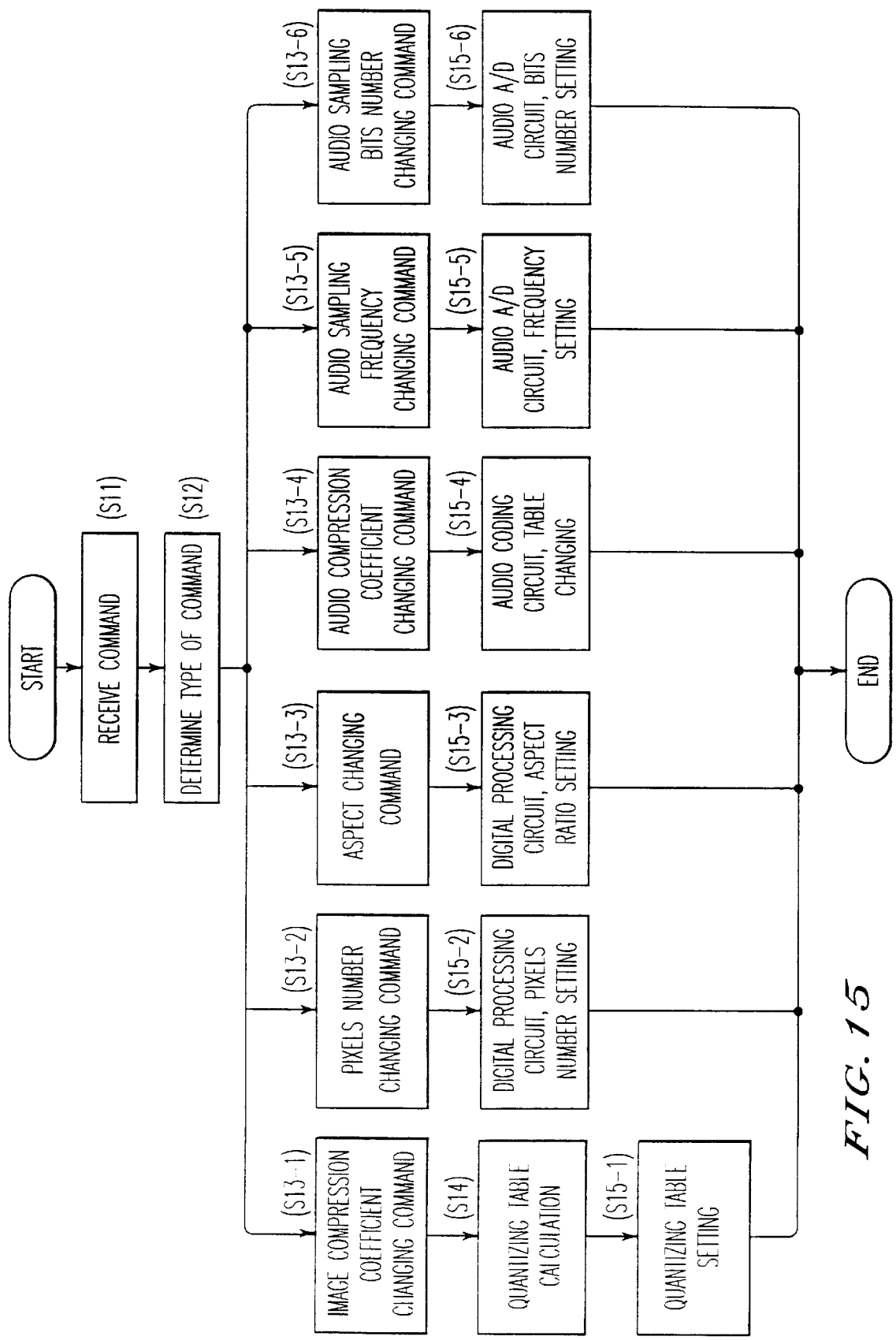
FIG. 15 is a flowchart illustrating the process of changing parameters used to control the camera.

FIG. 15 is a flowchart illustrating the process of receiving a command through the I/O card 15 and the manner of processing various commands. The illustrated process can be performed when commands are received by the camera from any command source. In FIG. 15, after starting, step S11 receives a command. The type of command is determined by the CPU 23 in step S12. Any type of command can be received and processed by the camera including any known command used to operate and control digital electronic cameras including electronic cameras capable for detecting one or a series of still pictures and displaying the pictures.

If the command is to change the amount of compression of images, step S13-1 determines that the image compression coefficient changing command has been received. This command can indicate a percent change in the amount of data needed to store the image or may directly contain a scale factor. A new quantizing table is calculated in step S14 based on the received image compression coefficient changing command. It is necessary to calculate the quantization table so that the amount of data necessary to code an image is within a predetermined range which is neither too large nor too small. The calculated quantized table is then written into the image data compression/expansion circuit 12 in step S15-1. The process then ends.

When the received command indicates that a pixel number changing command is received such as indicated in step S13-2, processing is performed in the image data compression/expansion circuit 12 and/or the digital signal processing circuit 11. This can be accomplished in a known manner by changing the quantization in accordance with a rate control method. Step S15-2 changes the parameters used to operate the circuitry in order to obtain the desired number of pixels.

When an aspect changing command is received as indicated in step S13-3, an interpolation processing of pixels is performed so as to obtain the desired aspect ratio by setting the appropriate parameters in the digital signal processing circuit 11 in step S15-3.

Other parameters of the camera are changed in similar manners. For example, when the received command indicates to change the audio compression coefficient as illustrated in step S13-4, the command to change the amount of audio compression is determined and the table used during the audio compression process is changed in step S15-4. When the received command indicates to change the audio sampling frequency as illustrated in step S13-5, the audio sampling frequency is changed by altering the parameters of the analog to digital converter 4 in step S15-5. Similarly, when the received command indicates to change the sampling number of bits for the audio in step S13-6, parameters are modified so that the audio analog to digital converter 4 outputs the appropriate number of bits in step S15-6. Further details regarding the processing performed in response to various types of commands used to change the parameters of a camera are disclosed in U.S. Pat. No. 5,034,804, which is incorporated herein by reference.

Any other command used to control and/or operate the camera can be set remotely through the I/O card 15. These commands include commands to take a single picture or a series of moving pictures, commands of whether or not to use the flash, focus parameter changing commands, exposure changing commands, commands to zoom the camera lens, commands to record only images, only audio, or a combination of images and audio, etc. These commands may be transmitted to the camera through the I/O card by either of the computers 33 or 35 illustrated in FIG. 3. Further, the commands may be transmitted by a dedicated handheld device such as an infrared remote, wired remote controller, or any other device. Further, any number of cameras and/or controllers such as computers may be connected together. Codes may be included in the communications between the cameras and controllers such as commands indicating the camera manufacturer's name, the model of the camera, the serial number of the camera, or any other identifying information of the camera or the controller. This will allow a plurality of cameras and controllers to be connected through a LAN or other means.

As the compression rate, pixel numbers, and pixel aspect ratio of the image signals can be changed either by the camera or remotely through the I/O card 15, the amount of encoded data representing the images can be controlled so that the bandwidth needed for transmission of the images to a remotely located monitoring device can properly occur without transmission errors. Further, since the compression rate, sampling frequency, sampling bit numbers of the audio data can be changed, the bandwidth can also be controlled or restriction thereof met. Additionally, whether or not the table data of the audio signals and the Huffman table, quantizing table, or scale factor is transmitted along with the coded image signals may be remotely set in order to reduce the amount of information which is needed to be transmitted.

The invention also allows automatic exposure controlling evaluation value data, automatic white balance controlling evaluation data, and automatic focusing evaluation data to be created and outputted to a remote monitoring device such as a computer, the state of the camera can be judged automatically and the compression ratio and number of pixel can be changed automatically based on the received image information.

Figure 16:
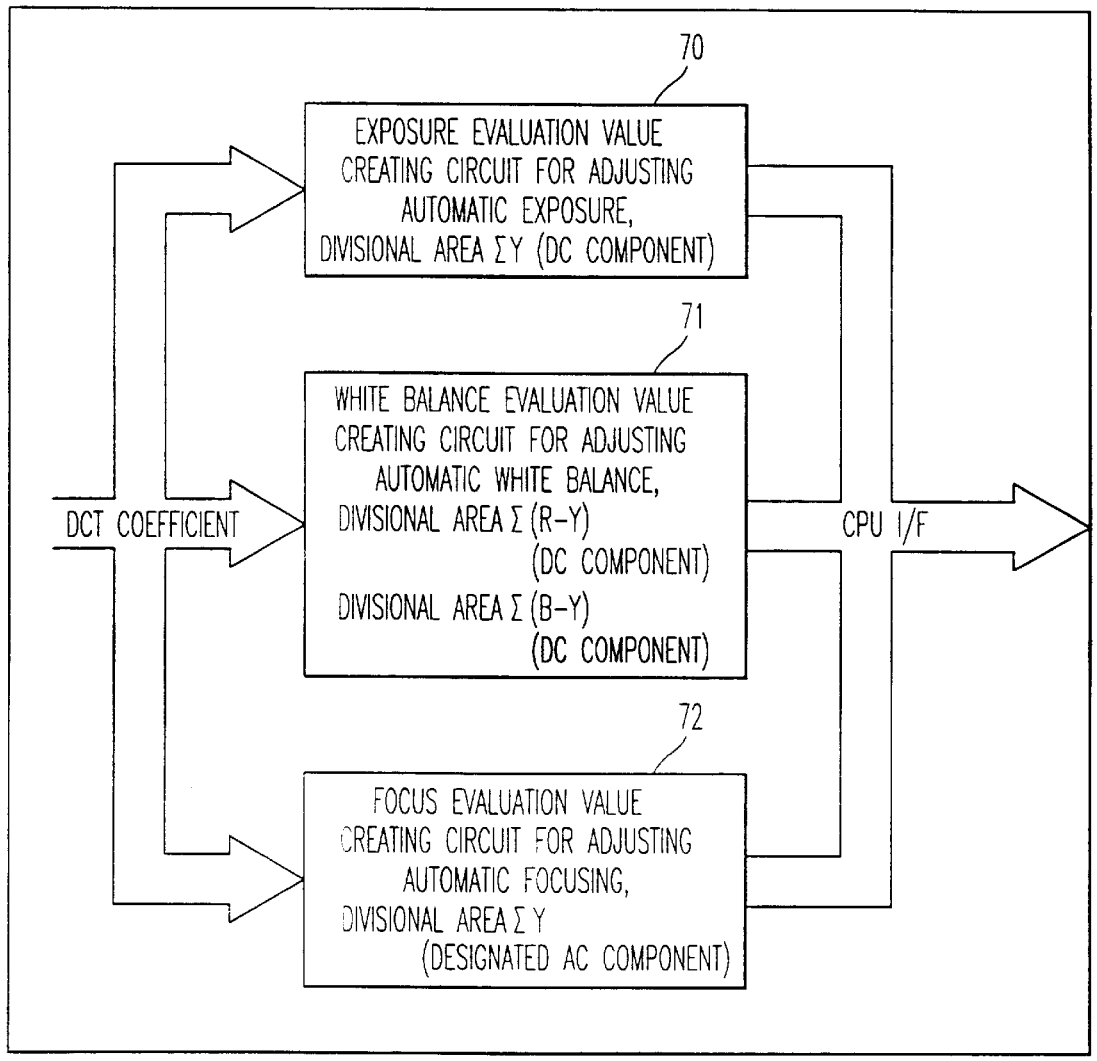
FIG. 16 is a block diagram illustrating a circuit for creating evaluation values.

The present invention evaluates various aspects of images which have been captured by the camera in order to perform automatic correction in the processing of the parameters used to capture images. The digital signal processing circuit 11 performs data compression in accordance with, for example, the JPEG standard, or an MPEG standard. In order to perform these compression procedures, the image is broken down into components, such as by creating coefficients in accordance with a known discrete cosine transformation (DCT) process in the digital signal processing circuit 11. In FIG. 16, the DCT coefficients are received and processed by the circuits 70, 71, and 72 which are shown in FIG. 16. These circuits may be connected between the digital signal processing circuit 11 and the CPU 23 in FIG. 30. Alternatively, the functions performed by these circuits may be carried out in the CPU 23. The DCT coefficients are obtained for subregions of the images which are arranged in grid-like patterns. Further details of the DCT, quantizing, Huffman coding, the use of a coding table and scale factor and disclosed in U.S. Pat. No. 5,295,077, which is incorporated herein by reference.

In FIG. 16 there is illustrated an exposure evaluation value creating circuit 70. This circuit sums up the DC component of the luminance signals Y for each of the areas within an image in order to create a value indicating the brightness of the captured image and to indicate how the exposure is to be automatically adjusted. Also illustrated is a white balance evaluation balance creating circuit 71 which is used to automatically adjust the white balance of the images. For example, artificial light has specific color components which are usually larger than the color components making up natural sunlight. Accordingly, the various color components of the images needs to be adjusted in order to have the final image appear to have balanced color. In this circuit, the DC components of the red signal minus the luminance signal are summed and in a similar manner, the summation of the DC components of the blue signal minus the luminance signal is performed in order to obtain the white balance evaluation information. Further, there is a focus evaluation value creating circuit which creates a focus evaluation value based on the AC component of the luminance signals summed over the image. The high frequency component of the luminance signals after integrated may be used to obtain the focus evaluation value. The camera may be focused in accordance with the method disclosed in commonly owned co-pending U.S. patent application Ser. No. 08/522,666, filed Sep. 1, 1995, entitled "A Focus Controlling Method and Apparatus" (attorney docket 557-3543-2), which is incorporated herein by reference.

When the state of the camera and camera parameters are transmitted to a monitoring device which is external to the camera through the I/O card 15, the above-described evaluation values and signal are outputted as part of the status signals from the camera side, as desired. It is possible to monitor abnormal occurrences by a remote monitoring device by monitoring the above-described values and also to detect variation in the state of the camera including a power supply failure or depletion, a stopped operation of the camera whether or not the flash is ready (charged), whether a coding error has occurred, whether there is sufficient light to obtain an adequate image, or any other factor. Further, changes in the luminance and/or focusing value can be used to indicate movement within an image, thus alerting a remote operator that something is changing in the environment which is being photographed or monitored remotely. This alarm can be either a warning light type of indicator and/or an audio warning. The connection between the camera (I/O card thereof) and the monitoring device allows images to be both received by the monitored device and transferred from the monitoring device to the camera.

The CPU 23 of the camera 30 evaluates the property of the I/O card 15 connected thereto. Depending upon the communication capabilities such as bandwidth of the type of I/O card, the CPU selects operating parameters of the camera in order to make the best use of the available I/O capabilities. The parameters which can be set based on the capabilities of the I/O card are described in the flowchart of FIG. 15.

As the I/O card 15 also is provided with a memory for storing images and audio, it is not necessary to have a separate recording medium for the captured images and audio, although of course it is possible to have a separate recording medium. Further, by locating the memory within the I/O card, it is not necessary to create special data transferring circuitry between the recording medium and the I/O card as the memory and necessary image and audio signals and data are stored within the I/O card 15. Additionally, as the memory for storing images and data may be located in the I/O card 15, the reliability of the system improves as it is not necessary to have two physically separate cards to perform the I/O operation and storing operation.

The programming of a conventional computer to control the camera externally can be implemented in a conventional manner by one of ordinary skill in the art. Further, it is not required to have the I/O card or the memory card conform to the PCMCIA standard but any type of I/O interface or memory device such as a hard disk, floppy disk, optical disk, optical card, or any other device may be used to implement the described functions. Each of the features of the present invention can be incorporated into an electronic filmless camera such as the camera described in the specification, the Ricoh DC-1 digital video camera which has both still and moving image recording modes, or any other known camera with an electronic image pick up. Each of the values being processed by the present invention are signals corresponding to physical phenomena such as focusing characteristics of an image, brightness of an image, color balance, etc.

The present invention can be implemented in a digital camera using an electronic processor such as a microprocessor or a digital signal processor programmed according to the teachings of the present invention, as will be apparent to those skilled in the art. Appropriate software coding can readily be prepared by skilled programmers based on the teachings of the present disclosure, as will be apparent to those skilled in the software art. The invention may also be implemented by the preparation of applications specific integrated circuits whereby interconnecting an appropriate network of conventional component circuits, as will be readily apparent to those skilled in the art. The invention is also the I/O card containing the memory used to store the control program.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A digital electronic camera system, comprising:
   a digital electronic camera including:
      a lens; and
      an electronic image pick-up which receives images through the lens;
   a detachably connected input/output interface including:
      a connector which detachably connects to the camera;
      a connector which connects to a processing device which is external to the electronic camera; and
      a memory unit which stores a control program for controlling communication between the camera and the processing device and which stores an attribute corresponding to a type of communication protocol used for said communication between the camera and the processing device,
   wherein the camera further includes:
      a memory;
      means for transferring the control program from the memory unit of the interface to the memory of the camera; and
      control means, connected to the memory of the camera, which controls an input and output of the camera using the control program transferred to the memory of the camera by said means for transferring.

2. A system according to claim 1, wherein:
   said means for transferring transfers the control program from the memory unit of the interface to the memory of the camera at a time when the interface is connected to the camera.

3. A system according to claim 1, wherein the camera further includes:
   image coding means for encoding digital representations of images captured by the electronic image pick-up.

4. A system according to claim 3, wherein the camera further includes:
   a microphone for capturing audio signals.

5. A system according to claim 1, wherein the camera further comprises:
   a memory for storing images captured by the electronic image pick-up; and
   retrieving means for retrieving images stored in the memory of the camera.

6. A system according to claim 1, wherein the interface further comprises:
   a memory for storing images captured by the electronic image pick-up.

7. A system according to claim 1, wherein the memory unit of the interface is a non-volatile rewritable memory.

8. A system according to claim 1, wherein said memory unit comprises:
   a first memory which stores said control program; and
   a second memory which stores said attribute.

9. A digital electronic camera system according to claim 1, wherein
   said memory unit stores a control program for controlling communication between the camera and a telephone device.

10. A system according to claim 9, wherein the telephonic device comprises a wireless telephone.

11. A system according to claim 1, further comprising:
    means for configuring said detachably connected interface of the camera to operate as a modem for connecting to said processing device external to the camera; and
    means for controlling the camera with the processing device external to the camera.

12. A system according to claim 11, wherein the means for controlling controls the camera with a computer connected to said camera through a computer on-line service.

13. A system according to claim 11, wherein the means for controlling controls the camera with a computer connected to said camera through an integrated services digital network.

14. A system according to claim 11, wherein the means for controlling controls the camera with at least one of a cellular telephone, a wireless telephone, and a phone connected to a public service telephone network.

15. A system according to claim 1, further comprising:
    means for capturing an image by the electronic pickup of the camera;
    means for storing the captured image in an image memory; and
    means for transferring the image in the image memory to said processing device external to the camera through said detachably connected interface of the camera configured to operate as a modem.

16. A system according to claim 15, wherein the means for transferring the image transfers the image to a computer through a computer on-line service.

17. A system according to claim 15, wherein the means for transferring the image transfers the image to a computer through an integrated services digital network.

18. A method for controlling a digital electronic camera, comprising:

capturing an image by an electronic image pick-up of the camera;

storing the captured image in an image memory;

transferring the image in the image memory to a processing device external to the camera through a detachably connected interface of the camera using a communication controller which uses a control program and an attribute corresponding to a type of communication protocol used by the control program contained in the interface; and transferring the control program contained in the interface to a control program memory in the camera, wherein said step of transferring the image transfers the image using the communication controller which uses the control program in the control program memory of the camera.

19. A method according to claim 18, wherein said step of transferring the control program transfers the control program at a time when the interface is connected to the camera.

20. A method according to claim 18, further comprising the steps of:

encoding the captured image; and recording audio by a microphone of the camera.

21. A method according to claim 18, further comprising the steps of:

configuring said detachably connected interface of the camera to operate as a modem for connecting to said processing device external to the camera; and controlling the camera with the processing device external to the camera.

22. A method according to claim 21, wherein the step of controlling controls the camera with a computer connected to said camera through a computer on-line service.

23. A method according to claim 21, wherein the step of controlling controls the camera with a computer connected to said camera through an integrated services digital network.

24. A method according to claim 21, wherein the step of controlling controls the camera with at least one of a cellular telephone, a wireless telephone, and a phone connected to a public service telephone network.

25. A method according to claim 18, wherein the step of transferring transfers the image in the image memory to said processing device external to the camera through said detachably connected interface of the camera configured to operate as a modem.

26. A method according to claim 25, wherein the step of transferring the image transfers the image to a computer through a computer on-line service.

27. A method according to claim 25, wherein the step of transferring the image transfers the image to a computer through an integrated services digital network.

28. An input/output interface which detachably connects to a digital electronic camera having a lens and an electronic image pick-up which receives images through the lens, the input/output interface comprising:

a connector which detachably connects to the camera;

a connector which connects to a processing device which is external to the electronic camera; and a memory unit which stores a control program for controlling communication between the camera and the processing device and which stores an attribute corresponding to a type of communication protocol used for said communication between the camera and the processing device, wherein the digital electronic camera includes a control means, connected to the connector which detachably connects to the camera, which controls an input and output of the camera using the control program in the memory unit of the detachably connected interface, wherein:

the input/output interface includes means for transferring the control program from the memory unit of the interface to a memory of the camera and the control means controls the input and output of the camera using the control program in the memory of the camera which has been transferred from the memory unit of the input/output interface.

29. An input/output interface according to claim 28, wherein said memory unit comprises:

a first memory which stores said control program; and a second memory which stores said attribute.

* * * * *